United States Patent
Bartoli et al.

(10) Patent No.: US 12,319,491 B2
(45) Date of Patent: Jun. 3, 2025

(54) CAPSULE FOR BEVERAGES

(71) Applicant: SARONG SOCIETA'PER AZIONI, Reggiolo (IT)

(72) Inventors: Andrea Bartoli, Ameglia (IT); Davide Capitini, Ameglia (IT)

(73) Assignee: ALUPAK ITALIA S.R.L., Milan (IT)

( * ) Notice: Subject to any disclaimer, the term of this patent is extended or adjusted under 35 U.S.C. 154(b) by 394 days.

(21) Appl. No.: 17/794,842

(22) PCT Filed: Feb. 18, 2021

(86) PCT No.: PCT/IB2021/051371
§ 371 (c)(1),
(2) Date: Jul. 22, 2022

(87) PCT Pub. No.: WO2021/165869
PCT Pub. Date: Aug. 26, 2021

(65) Prior Publication Data
US 2023/0090930 A1  Mar. 23, 2023

(30) Foreign Application Priority Data

Feb. 19, 2020  (IT) .................. 102020000003425
Apr. 9, 2020   (IT) .................. 102020000007669
Jun. 29, 2020  (IT) .................. 102020000015676

(51) Int. Cl.
*B65D 85/804*  (2006.01)

(52) U.S. Cl.
CPC .................. *B65D 85/8064* (2020.05)

(58) Field of Classification Search
CPC .................................. B65D 85/8064
USPC ............................................. 426/115
See application file for complete search history.

(56) References Cited

FOREIGN PATENT DOCUMENTS

| EP | 0722980 A1 | 7/1996 |
|----|------------|--------|
| EP | 1654966 A1 | 5/2006 |
| ES | 1226796 U  | 3/2019 |
| GB | 2569042    | 6/2019 |
| GB | 2570310 A  | 7/2019 |

(Continued)

OTHER PUBLICATIONS

Notice of Opposition dated May 31, 2023 from counterpart European Patent No. EP3983314.

(Continued)

*Primary Examiner* — Brent T O'Hern
(74) *Attorney, Agent, or Firm* — SHUTTLEWORTH & INGERSOLL, PLC; Timothy J. Klima

(57) ABSTRACT

A capsule is proposed herein including: a casing that extends about an axis, which includes a base wall and a side wall defining a cavity containing an initial product to be joined to a fluid to obtain a final product, and a flanged edge extending from said side wall; a covering element, fixed to the flanged edge to close the cavity; a sealing element, associated with the flanged edge to make a fluidic seal with a dispensing machine; wherein the sealing element includes a cellulose-based ring; and wherein the ring includes a stratified structure including at least two cellulose-based layers, between which there is an outer layer arranged towards the outside and configured to contact the dispensing machine and an inner layer; a joining layer to enable the ring to be joined to the flanged edge; and a further joining layer, to join together the two cellulose-based layers.

20 Claims, 10 Drawing Sheets

(56) References Cited

FOREIGN PATENT DOCUMENTS

| WO | 2007113100 | A2 | 10/2007 | | |
|----|------------|----|---------|---|---|
| WO | 2015082982 | A1 | 6/2015 | | |
| WO | 2015101394 | A1 | 7/2015 | | |
| WO | 2016186488 | A1 | 11/2016 | | |
| WO | WO-2019092144 | A1 * | 5/2019 | ............. | B32B 15/12 |
| WO | 2020225390 | A1 | 11/2020 | | |

OTHER PUBLICATIONS

International Search Report and Written Opinion dated Jul. 13, 2021 from counterpart International Patent Application No. PCT/IB2021/051371.

Notice of Opposition dated May 31, 2023 from counterpart European Patent No. EP3983314 Reply of the Patent Proprietor to the Notice of Opposition dated Oct. 18, 2023 Summons and Preliminary Opinion dated Mar. 6, 2024 Decision dated Dec. 3, 2024.

* cited by examiner

Fig.3
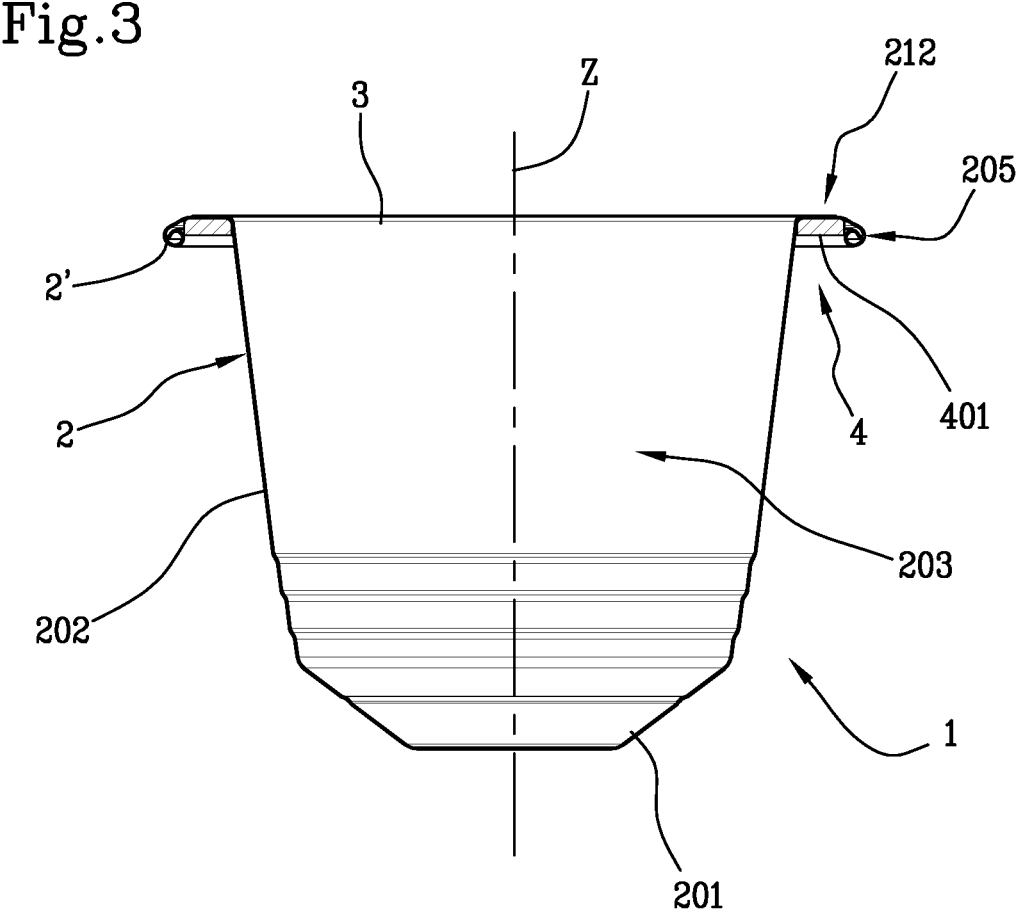
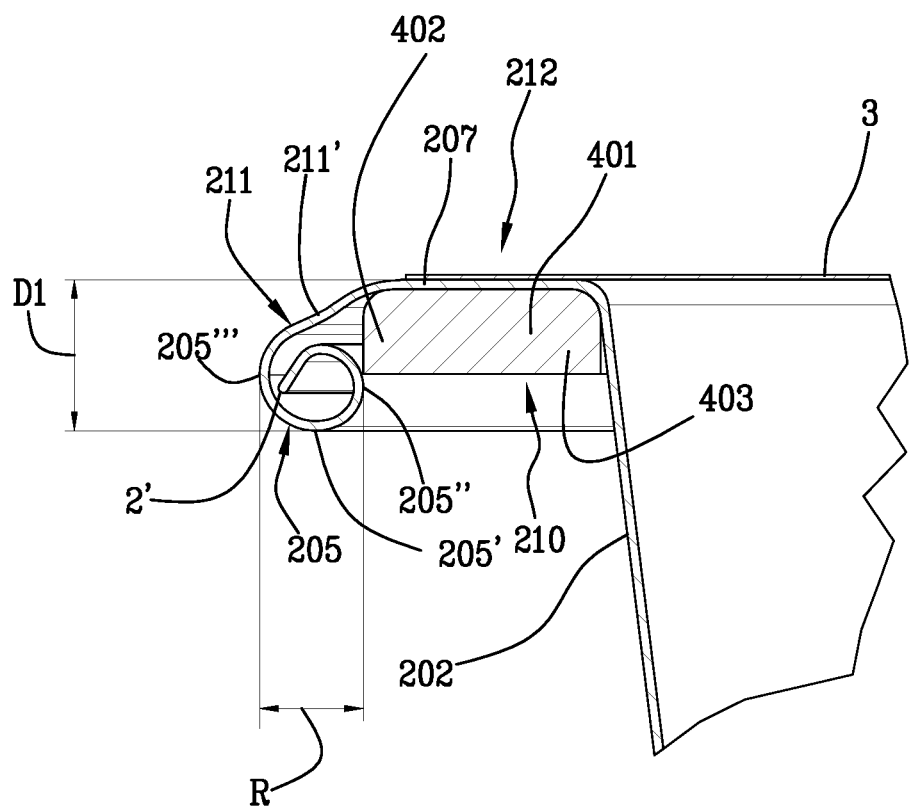
Fig.4

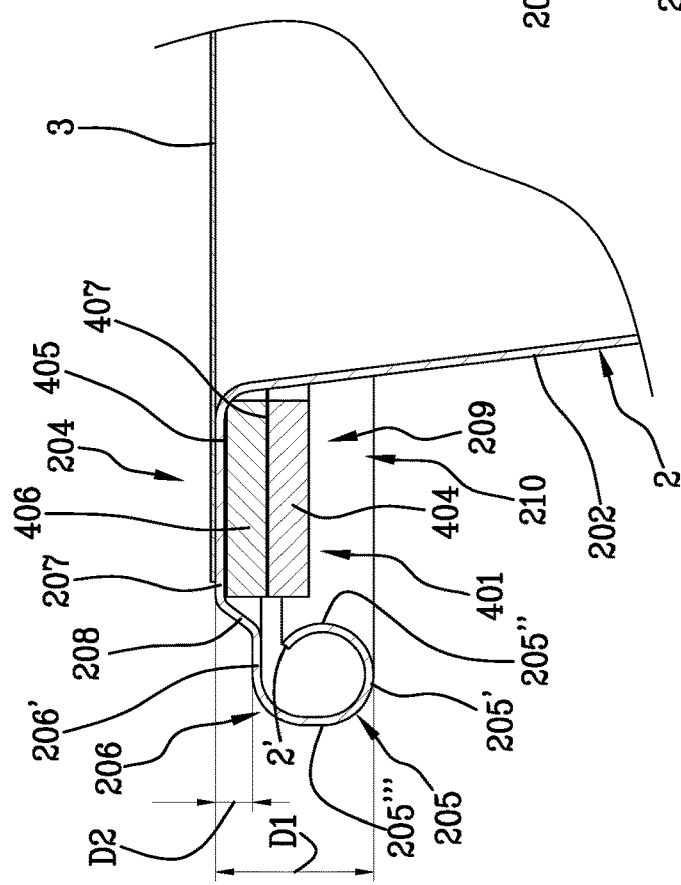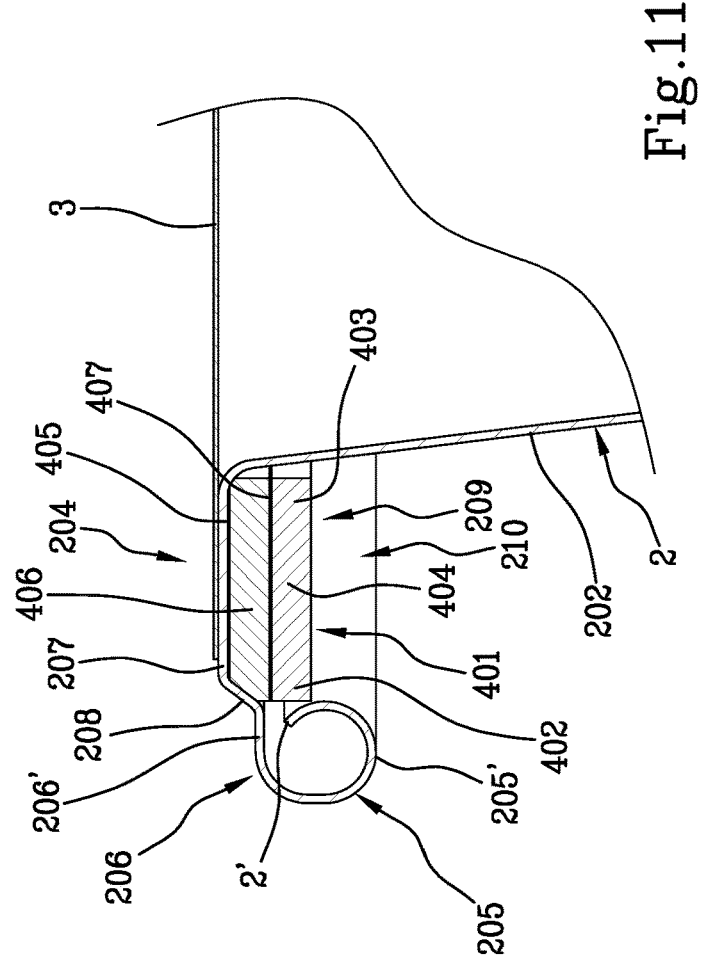

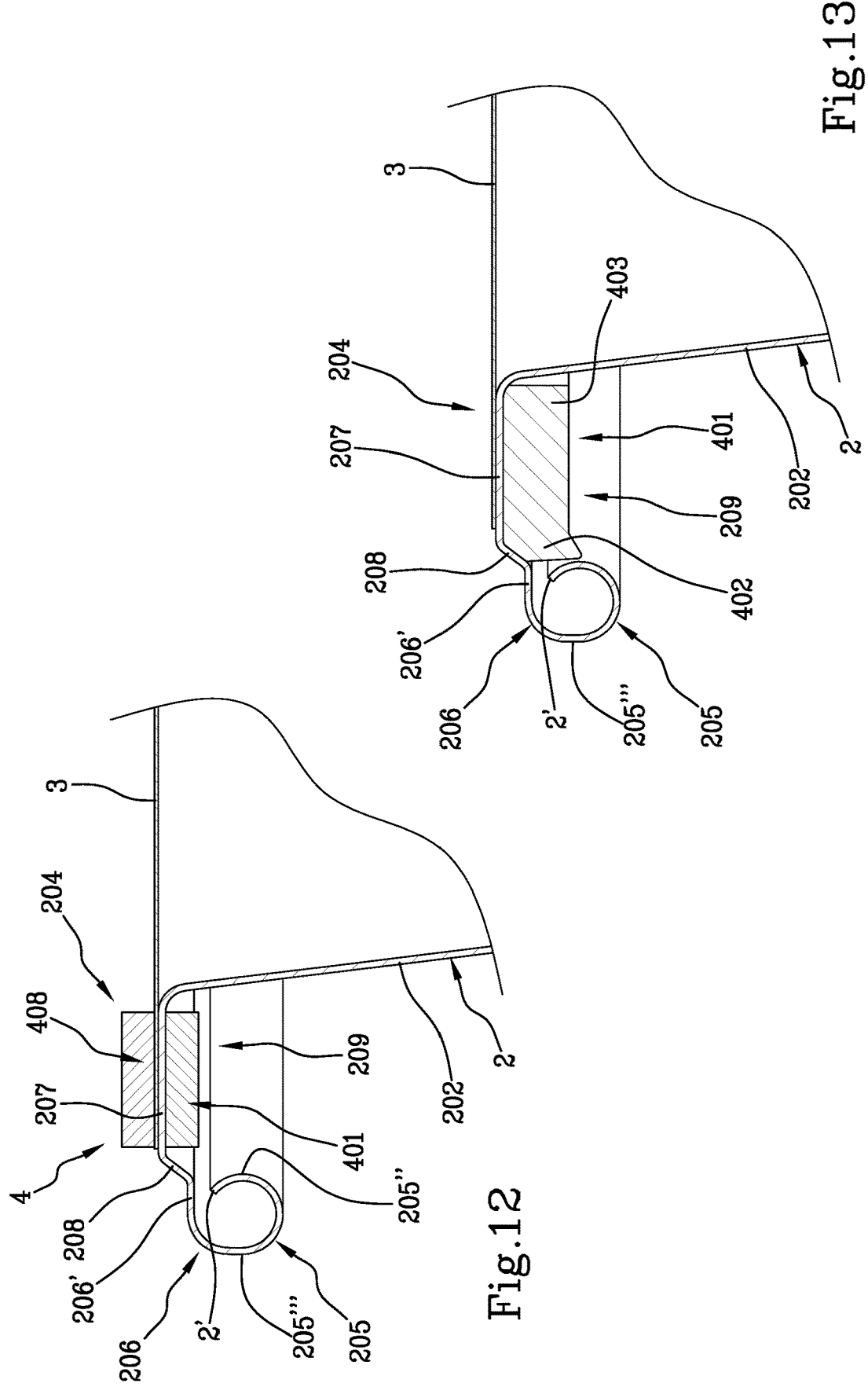

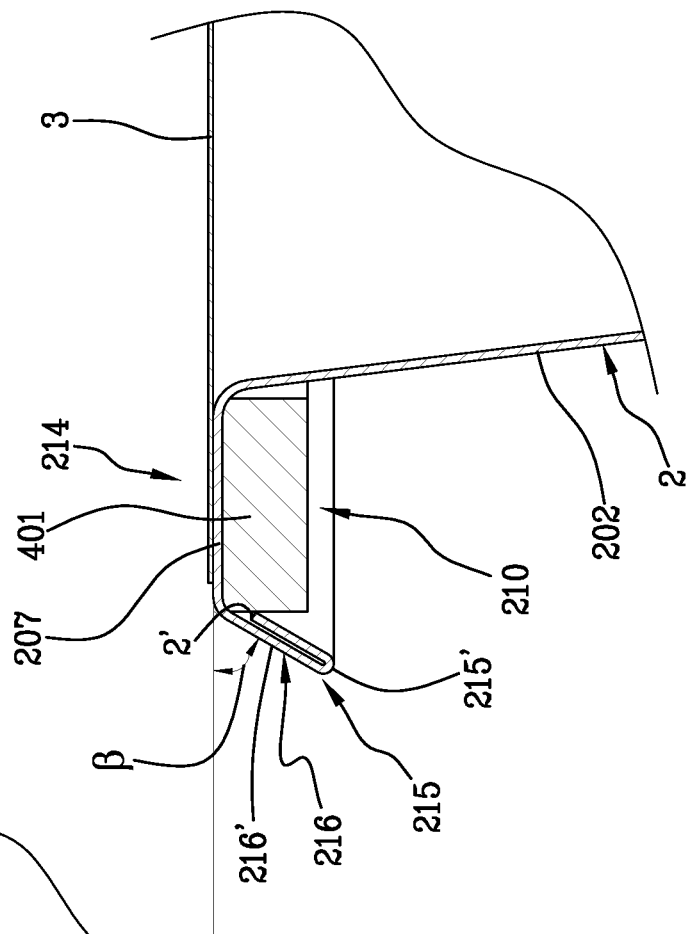
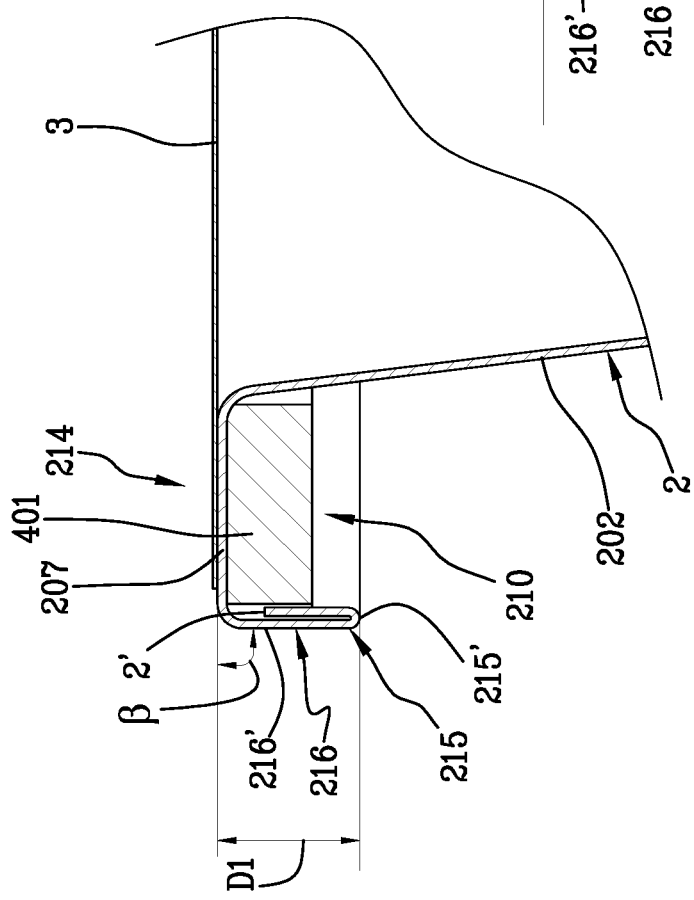

CAPSULE FOR BEVERAGES

CROSS-REFERENCE TO RELATED APPLICATIONS

This application is the National Phase of International Application PCT/IB2021/051371 filed Feb. 18, 2021 which designated the U.S.

This application claims priority to Italian Patent Application No. 102020000003425 filed Feb. 19, 2020, Italian Patent Application No. 102020000007669 filed Apr. 9, 2020, and Italian Patent Application No. 102020000015676 filed Jun. 29, 2020, which applications are incorporated by reference herein.

BACKGROUND OF THE INVENTION

The present invention relates to a capsule for beverages that is a capsule that is suitable for containing an initial product to be joined to a fluid to obtain a final product.

In particular, the invention relates to a single-dose and disposable capsule containing an initial product, for example like coffee powder that is able to make, by interacting with pressurized water, a final product, for example a coffee beverage.

In detail, the capsule is particularly configured to prepare products, for example beverages, in automatic dispensing machines.

The known capsules for use in dispensing machines are disposable, single-dose containers comprising an outer casing and having the shape of a glass or cup. The casing usually has a base wall and a side wall defining a cavity containing the initial product, for example ground coffee or tea, from which the final product is to be obtained, for example the beverage. A flanged edge extends from the side wall and is arranged around the cavity, on the side opposite the base wall.

The cavity, at its own mouth, is hermetically closed by a covering element, fixed to the flanged edge, so as to seal the initial product inside the container.

The capsule can be used in a dispensing machine in which the capsule can be inserted by a user, into a chamber of the dispensing machine. During dispensing, the base wall of the capsule is perforated by an injection device to inject pressurized liquid, for example water, into the capsule and the covering element is perforated by a dispensing device of the dispensing machine to enable the final product to be dispensed.

The dispensing device of the dispensing machine comprises a dispensing plate provided with a plurality of pointed elements that, when a pressure of the fluid inside the capsule increases, engage with the covering element and perforate it in a plurality of different zones. The final product can flow into a fruition container through the perforations made by the dispensing device of the dispensing machine.

For good dispensing results, the capsule further comprises a sealing element arranged at the flanged edge which is configured to make a fluidic seal with the dispensing machine, in particular with a protrusion-shaped housing element of the dispensing machine, the capsule being insertable into the protrusion-shaped housing element.

The sealing element prevents an outflow of the pressurised liquid at high operating pressure of the dispensing machine and, in use, is crushed between the housing element of the dispensing machine and the dispensing plate of the dispensing device.

An example of a capsule with sealing element is provided by patent EP1654966, in which the casing is made of aluminium and the sealing element is an elastic ring made of silicone rubber fixed to the flanged edge.

Using aluminium for the casing of the capsule is particularly advantageous because it enables the initial product to be kept a long time inside the cavity, being impermeable to oxygen and to water vapour. However, placing the elastomeric ring in the silicone casing requires devices to apply the silicone rubber to the flanged edge and it is difficult to produce, with the consequence that, if the sealing element is applied imprecisely, undesired leaks of water can occur during dispensing of the beverage.

In addition, although the aluminium itself is recyclable, a body formed by the aluminium casing and by the silicone rubber sealing element is no longer recyclable and this constitutes a problem for the increasingly felt need to make an entirely recyclable product for the purposes of waste disposal.

For this purpose, capsules have become widespread on the market in which the casing can be in aluminium, in recyclable plastic material, or in PLA (polylactic acid), or in another compostable material such as cellulose, and in which the sealing element can be a ring of compostable material, for example it is made of a cellulose-based material, for example paper or of natural fibres to ensure that the capsule has only compostable or completely recyclable components.

In the most widespread capsules on the market with an aluminium casing, the flanged edge is planar and can comprise a curled annular end bead, at which one border of the aluminium casing is folded on itself in accordance with the prior art. The annular bead is symmetrical with respect to the flanged edge and extends both towards the base wall and on the opposite side with respect to it.

In capsules of other material, be it PLA, compostable material or recyclable plastic material, the flanged edge can be planar and without the annular bead at the end.

By conducting experimental dispensing tests with capsules in which the sealing element is not silicone rubber but cellulose-based material, for example paper and/or cardboard, the Applicant noted that defective dispensing operations can occur.

For example, the Applicant has verified that the beverage can be preceded by dispensing of only water.

This defectiveness is due to the occurrence of leaks of water from the front and/or rear of the dispensing machine that, being conveyed to the fruition container intended to subsequently receive the beverage, dilute in an undesired manner the beverage to be obtained.

Such leaks are fluidic losses that can be front and/or rear losses and may be due to infiltration of water into the paper sealing element, which damage the seal ring itself during dispensing, or to a partial detachment of the sealing element from the flanged edge due to the pressure of the water injected to make the beverage.

For this purpose, capsules with a paper sealing element have been proposed, like for example in the document ES1226796U, in which the sealing element is externally coated, for example, with a layer of an impermeable lacquer, exhibiting known hydrophobic activities.

However, applying the surface lacquer to the sealing element is a very complex operation and the resulting sealing element is particularly expensive.

BRIEF SUMMARY OF THE INVENTION

The technical purpose which forms the basis of the present invention is thus to make available a capsule that overcomes the drawbacks of capsules of known type.

A further purpose of the present invention is to obtain a capsule with a sealing element made of paper material that reduces the percentage of defectiveness, that is the percentage of defective dispensing operations due to fluidic leaks with respect to the total dispensing operations made, to improve the quality of the dispensed beverage.

Another further purpose of the present invention is to obtain a capsule, that is simple to make and of moderate cost, with sealing element made of paper material that allows good beverage extraction quality and which at the same time is simple and cheap to produce.

These purposes are achieved by a capsule in accordance with the present invention, comprising the technical characteristics set out in one or more of the appended claims.

BRIEF DESCRIPTION OF THE DRAWINGS

Further characteristics and advantages of the present invention will become more apparent from the following indicative, and hence non-limiting, description of a preferred, but not exclusive, embodiment of a capsule as illustrated in the appended drawings, in which:

FIG. 3 shows a sectional view of the capsule of FIG. 1;

FIG. 4 shows an enlargement of the sectional view of FIG. 3, in which the flanged edge is shown in detail, comprising a first portion, which comprises an annular bead arranged at the end of the flanged edge and in which a border of the casing is curled, a second planar portion, and a sealing element, made as a ring and associated with the second portion of the flanged edge on the side facing the base wall;

FIG. 10 shows an enlargement of the flanged edge of a version of the capsule of FIG. 8, in accordance with the present invention, in which the ring is made by the stratified structure of FIGS. 5 and 6;

FIG. 11 shows an enlargement of the flanged edge of a different version of the capsule of FIG. 8, in accordance with the present invention, in which the ring abuts on the connecting portion and the annular bead;

FIG. 12 shows an enlargement of the flanged edge of another different version of the capsule of FIG. 8, in which the sealing element comprises a ring associated with the flanged edge on the side facing the base wall and a further ring, arranged on the opposite side of the flanged edge and facing the ring;

FIG. 13 shows an enlargement of the flanged edge of a further version of the capsule of FIG. 8, in which the ring has an outer flexed zone, which extends from an inner planar zone, abutting on the connecting portion and the annular bead;

FIG. 14 shows an enlargement of the flanged edge of another variant of the capsule of FIG. 1, which differs from the capsule of FIG. 1 in that the flanged edge comprises an annular bead, in which the border of the casing is folded and flattened, the first portion being planar and forming an angle with the second portion equal to 90°;

FIG. 15 shows an enlargement of the flanged edge of a different version of the capsule of FIG. 14, in which the first portion forms an acute angle with the second portion;

DETAILED DESCRIPTION OF THE INVENTION

Figure 1:
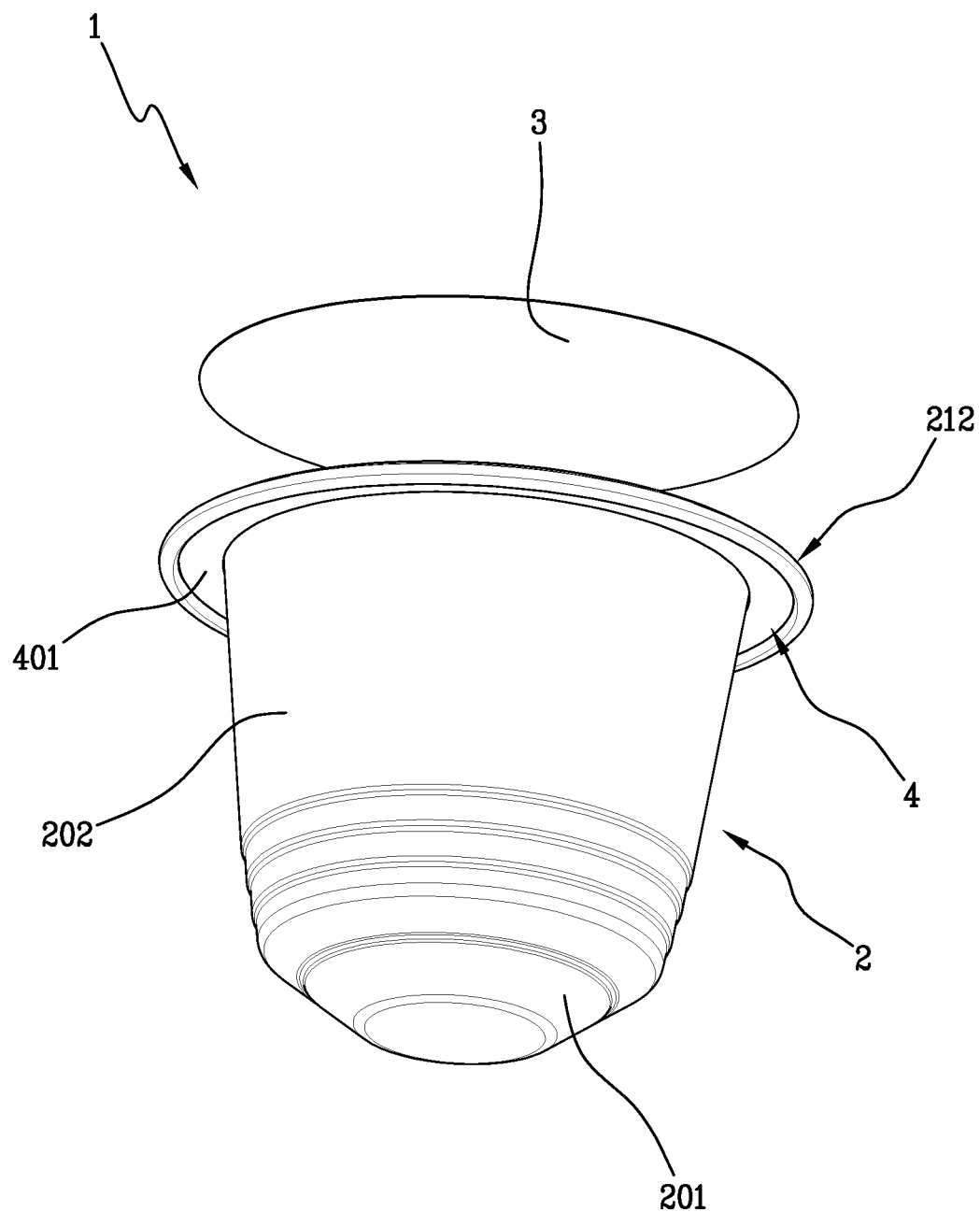
FIG. 1 is a perspective view of a capsule on the side of a base wall of the capsule itself, which comprises a casing having a flanged edge, in which for clarity's sake a covering element fixed to the flanged edge is shown detached therefrom.

In the following description, the same elements are indicated with the same reference numbers in the various figures. It is also specified that unless differences are explicitly stated, the same elements are deemed to be applicable to all the different variants.

With reference to FIGS. 1 to 7, 1 denotes a capsule in accordance with the present invention, which is usable in a dispensing machine, which is not illustrated. More precisely, the capsule 1 is insertable into a dispensing chamber, which is not illustrated, of the dispensing machine.

The capsule 1 comprises a casing 2 that has an axis Z of longitudinal extent shown in FIG. 3, for example an axis of symmetry.

The casing 2, as will be seen better in detail below, is preferably made of aluminium, for example by drawing.

The casing 2 can alternatively be made of a compostable material, for example in PLA (polylactic acid), or of a cellulose-based material such as paper, or even in a recyclable or recycled plastic material (so that it can be recyclable several times over time).

The casing 2 is substantially of truncated-cone shape, that is shaped as a glass or cup. The casing 2 comprises a base wall 201 and a side wall 202, defining a cavity 203 that is open, shown in FIGS. 2 and 3, and a flanged edge 212, which extends from the side wall 202.

In detail, the side wall 202 is divergent from the base wall 201 as far as an end, starting from which the flanged edge 212 extends substantially radially.

The cavity 203 is adapted to contain an initial product (not illustrated) to be joined to a fluid (not illustrated) to obtain a final product (not illustrated). The fluid is, preferably, a hot or cold pressurized liquid, introduced into the cavity 203 in a step of injecting the fluid to obtain the final product.

As said previously, the initial product is for example a soluble, freeze-dried, dehydrated, concentrated, percolatable, lyophilised, powdered food product—for example coffee; alternatively, the initial preparation can be for example a leaf food product—for example tea. The fluid is preferably water, which is hot and pressurized, which enables a beverage to be obtained, for example coffee, barley, tea or an herbal drink.

The flanged edge 212 may comprise an annular bead 205, which is arranged at an outer end of the flanged edge 212 itself.

A border 2' of the casing 2 can in fact be folded in the annular bead 205 so that it is positioned inside the bead 205 itself.

The annular bead 205 is typically present in capsules with an aluminium casing 2. If the casing is made of another material (for example PLA, compostable material, or recyclable plastic material) the flanged edge is usually planar since the border 2' of the casing cannot be folded.

It is specified that, in the rest of the description, reference will be made to an aluminium casing 2 provided with an annular bead, although the present invention is equally applicable also to capsules with casing 2 made of one of the other materials mentioned above, without thereby losing generality.

The capsule 1 comprises a covering element 3 fixed to the flanged edge 212 to close the cavity 203. The covering element 3 is fixed to the flanged edge 212 by heat or ultrasound welding, or gluing, opposite to the base wall 201.

The covering element 3 is perforable by a dispensing device of the dispensing machine so that the final product can be dispensed through the covering element 3.

A sealing element 4 is associated with the flanged edge 212 to make a fluidic seal with the dispensing machine, for example with a housing element of the dispensing machine, the housing element being shaped as a protrusion.

The sealing element 4 comprises an annular body 401, arranged on the side of the base wall 201, which is made of a cellulose-based material and thus made as a paper or cardboard ring, or natural fibre ring or ring made of a composition which comprises a combination of these materials.

Subsequently, for simplicity's sake, but without limiting the scope, the ring 401 will be cited as being made with a cellulose base, for example paper and/or cardboard.

Owing to the fact that the sealing element 4 comprises the cellulose-based ring 401, the sealing element 4 is easily made and moreover makes the capsule 1 entirely recyclable.

The flanged edge 212 comprises a first portion 211 which comprises the annular bead 205 and a second portion 207 contiguous with the side wall 202.

The second portion 207 is annular and lies on a first plane.

The first portion 211 is contained in a half-space, defined by the first plane and facing the base wall 201 and extends in a direction parallel to the axis Z towards the base wall 201 as far as a free edge 205' of the annular bead 205.

The free edge 205' of the annular bead 205 is, in other words, the end closest to the base wall 201 of the annular bead 205.

Since the annular bead 205 represents the outer end of the flanged edge 212, the free edge 205' also represents the end of the first portion 211 closest to the base wall 201.

As illustrated in FIGS. 1 to 7, the first portion 211 is defined without discontinuity from the border 2' of the casing 2 through the annular bead 205 as far as the second portion 207.

The expression "without discontinuity" means that, starting from the border 2' of the casing 2, the first portion 211 is without angles, that is, it is a curved surface in which angles are absent between contiguous sections thereof.

Between the first portion 211 and the side wall 202 facing the first portion 211, a recess 210 can therefore be defined in which the ring 401 is accommodated, the free edge 205' of the annular bead 205 being at a first distance D1 from the first plane that is greater than or equal to the thickness of the ring 401, so that the recess 210 can contain the ring 401 entirely.

The recess 210 defined between the first portion 211 and the side wall 202 is concave and has a bottom which is defined by the second portion 207.

The ring 401 can be contained inside the overall dimensions of the first portion 211 as far as the annular bead 205 within the first distance D1.

In other words, the first portion 211 delimits the recess 210 on the opposite side of the side wall 202 as far as the free edge 205' and, since the thickness of the ring 401 is less than or equal to the first distance D1, the free edge 205' protrudes, or is aligned, with respect to ring 401.

As will be seen, this enables an effective uncoupling from the dispensing machine to be obtained after dispensing.

As already disclosed previously, the dispensing plate is provided with a plurality of pointed elements (not illustrated) that, during dispensing when a pressure of the fluid inside the capsule increases, engage with the covering element 3 and perforate it in a plurality of different zones.

In fact, the Applicant was able to experimentally verify a considerable improvement in defectiveness due to the fall of the capsule 1 at the end of dispensing.

The recess 210, in fact, is able to contain internally the ring 401 and thus possible friction between the paper and ejection guides (not illustrated) of the dispensing machine that may prevent the capsule 1 from being correctly uncoupled can be avoided.

The free edge 205' extends beyond the thickness of the ring 401, or is aligned therewith, and therefore the recess 210 contains the ring 401 entirely. The capsule 1 can considerably reduce the defectiveness linked to the automatic uncoupling from the dispensing machine, managing to zero them.

However, it should be noted that the first portion 211 comprises a tilted wall 211' which is joined on one side to the annular bead 205 without discontinuity and on the other side to the first portion 211 with discontinuity.

The first portion 211, and in detail the tilted wall 211', instead forms an angle α with the second portion 207 which therefore defines a discontinuity between the second portion 207 and the tilted wall 211'.

According to a version not shown, if the capsule is made of another material (compostable material, PLA, or recyclable or recycled plastic), the fact that the first portion 211, without the annular bead 205, is contained in the half-space facing the base wall 201, so as to be able to contain the ring 401 entirely, and thus form a discontinuity with the second portion 207 can still be valid.

If we now consider the first distance D1, it can be noted that this first distance D1 is comprised between 0.4 mm and 2.20 mm, still more preferably comprised between 0.90 mm and 1.90 mm, still more preferably equal to 1.60 mm.

According to an alternative version, the first distance can be for example equal to 2.10 mm.

As shown in FIGS. 1 to 7, the annular bead 205 is curled and extends radially between an inner edge 205" and an outer edge 205" for a maximum diameter of width R, which can be comprised in a range from 0.4 mm to 1.5 mm, preferably equal to 1.1 mm.

If the annular bead 205 has a diameter of 0.4 mm, the border 2' of the casing is almost folded on itself and curled, while starting from a diameter of 0.8 mm up to a diameter of 1.5 mm, the annular bead 205 is rounded in shape, as represented in FIGS. 1 to 13.

In addition to the diameter of 1.1 mm, other preferred diameters are possible, such as 0.9 mm, 1.0 mm, 1.2 mm, or 1.3 mm.

The annular bead 205 can extend in the first plane towards the base wall 201 so that the free edge 205' is placed at a first distance D1 equal, at least, to the minimum diameter of the curled annular bead 205.

However, in order for the free edge 205' to extend beyond the thickness of the ring 401, preferably the annular bead 205 is displaced towards the base wall 201 so that the first distance D1 is greater than the maximum diameter of the bead ring 205 itself.

For example, if the curled annular bead 205 has a diameter equal to 1.1 mm, the free edge 205' can be advantageously placed at the first distance D1 equal to 1.6 mm, i.e. be further displaced by 0.5 mm with respect to the diameter of the annular bead 205, taking into account the dimension and inclination of the tilted wall 211'.

Alternatively, according to a different version of the capsule, if the curled annular bead 205 has a diameter equal to 1.1 mm and the free edge 205' can be placed at the first distance D1 equal to 2.1 mm, it can be further displaced by 1.0 mm with respect to the diameter of the annular bead 205.

The first portion 211 is contained radially between the inner edge 205" and the outer edge 205''' of the annular bead 205.

In fact, the border 2' is folded in the annular bead 205 and extends without discontinuity through the tilted wall 211' as far as the second portion 207.

The absence of discontinuity in the first portion 211 of the flanged edge 212, which is contained in the half-space facing the base wall 201, the discontinuity present between the tilted wall 211' of the first portion 211 and the second portion 207, as well as the fact that the free edge 205' is preferably displaced with respect to the diameter of the annular bead 205 towards the base wall 201, makes the flanged edge 212 itself more easily adaptable when, together with the ring 401, is clamped between the housing element and the dispensing plate of the dispensing machine and cooperates in making the fluidic seal with the dispensing machine.

Furthermore, in the half-space the recess 210 can be defined in a simple way.

The first portion 211 is shaped so as to be wound initially around the border 2', defining the annular bead 205, and subsequently to progressively move away from the annular bead 205 as far as the second portion 207.

The first portion 211 is thus shaped like a spiral which, starting from the border 2' is wound initially around it, defining the annular bead 205, and which, subsequently, progressively moves away from the annular bead 205 as far as the second portion 207 through the tilted wall 211'.

It can be noted that, if the annular bead 205 is curled or rounded and the first portion 211 extends without discontinuity, the user can handle the aluminium capsule in total safety, as there are no pointed parts that might damage the user. In fact, not only is the border 2' of the casing folded inside the annular bead 205, but also edges that might annoy the user are absent.

The angle $\alpha$, which generates the inclination of the tilted wall 211', can be comprised between 10° and 90°, preferably comprised between 14° and 65°, still more preferably comprised between 20° and 45°, preferably equal to 25°. Alternatively, the angle $\alpha$ can also preferably be equal to 38°. In fact, it is preferable that the tilted wall 211' forms an acute angle with the base wall 207 so that the annular bead 205 is displaced towards the base wall 201 and at the same time the first portion 211 extends without discontinuity through the inclined wall 211'.

As regards the position of the ring 401, it is associated with the flanged edge 212 at least in a region intended to make the fluidic seal with the dispensing machine and i.e. in the region with which, during dispensing, the protrusion-shaped housing element of the dispensing machine engages.

This applies both considering the capsule 1 of FIGS. 1 to 7 and of FIGS. 14 and 15 in accordance with the present invention and considering a capsule 1', which will be described below and which is shown in FIGS. 8 to 13 and in the FIG. 16.

The ring 401 can comprise an outer zone 402, shown in FIG. 4, which extends as far as abutting on the first portion 211.

Figure 6:
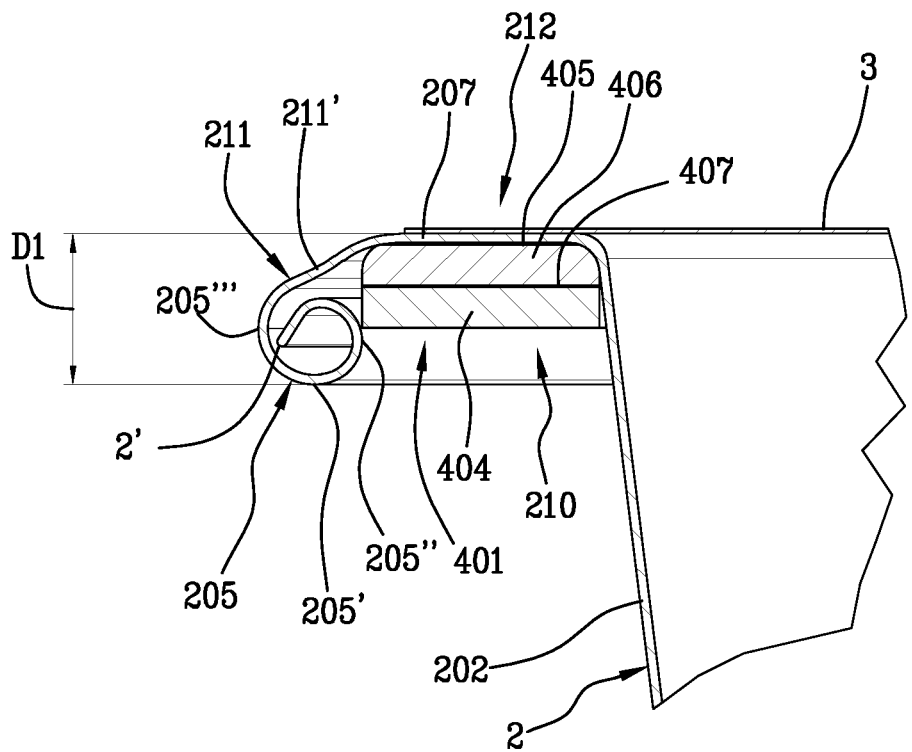
FIG. 6 shows an enlargement of the flanged edge of a different version of the capsule of FIG. 1, in which the ring, made by the stratified structure of FIG. 5, in accordance with the present invention, abuts on the annular bead and a side wall of the capsule.

In other words, the radial extension of the ring 401 can be such as to abut on the first portion 211, and more precisely the inner edge 205" of the annular bead 205, in relation to the thickness of the ring 401, as shown in FIGS. 4 and 6.

The ring 401 can also comprise an inner zone 403 from which the outer zone 402 extends, which can extend as far as it abuts on the side wall 202 of the capsule 2, as shown in FIG. 4, regardless of whether the outer zone 402 can abut or not on the first portion 211.

If, for example, the ring 401 is about 1 mm wide and extends starting from the side wall 202, the fluidic seal with the housing element of the dispensing machine is anyway ensured.

However, the ring 401 can also be associated only with the second portion 207 without necessarily abutting on the first portion 211 and/or the side wall 202.

In a variant, the ring 401 can be L-shaped to follow, at least partially, both the flanged edge 212 and the side wall 202.

As regards the manner in which the ring 401 is made, it is specified that this applies to all the variants or versions of capsules shown in FIGS. 1 to 16.

The ring 401 can comprise a single layer of cellulose-based material intended to contact the dispensing machine. The layer can be, for example, made of paper or cardboard, with grammage comprised between 250 g/m2 and 900 g/m2, preferably comprised between 300 g/m2 and 750 g/m2, preferably equal to 350 g/m2 and 700 g/m2.

The term grammage means a density value of the paper and/or of the cardboard, which is expressed as a value in grams by square metre.

Although the paper and/or the cardboard has a thickness that usually depends on the grammage used, the thickness of the paper and/or cardboard can vary according to different factors, like for example the type of processing performed during production of the paper and/or cardboard or the quantity of wood fibre present therein.

In fact, for the same grammage, high density paper and/or cardboard may exist that has a set thickness and a low density paper and/or cardboard that has thickness greater than the set thickness.

For this reason, although the preferred grammage for making the paper ring is comprised in a grammage range as disclosed above, the thickness of the ring 401 will also be indicated below because the experimental tests conducted were based on the thickness of the ring 401.

The ring 401 can comprise a stratified structure which comprises at least one outer layer 404, based on cellulose, and a joining layer 405 configured to enable the stratified structure to be joined the flanged edge 212, that is, to the second portion 207.

The joining layer 405 is a layer of adhesive material that is activatable by heat.

Figure 2:
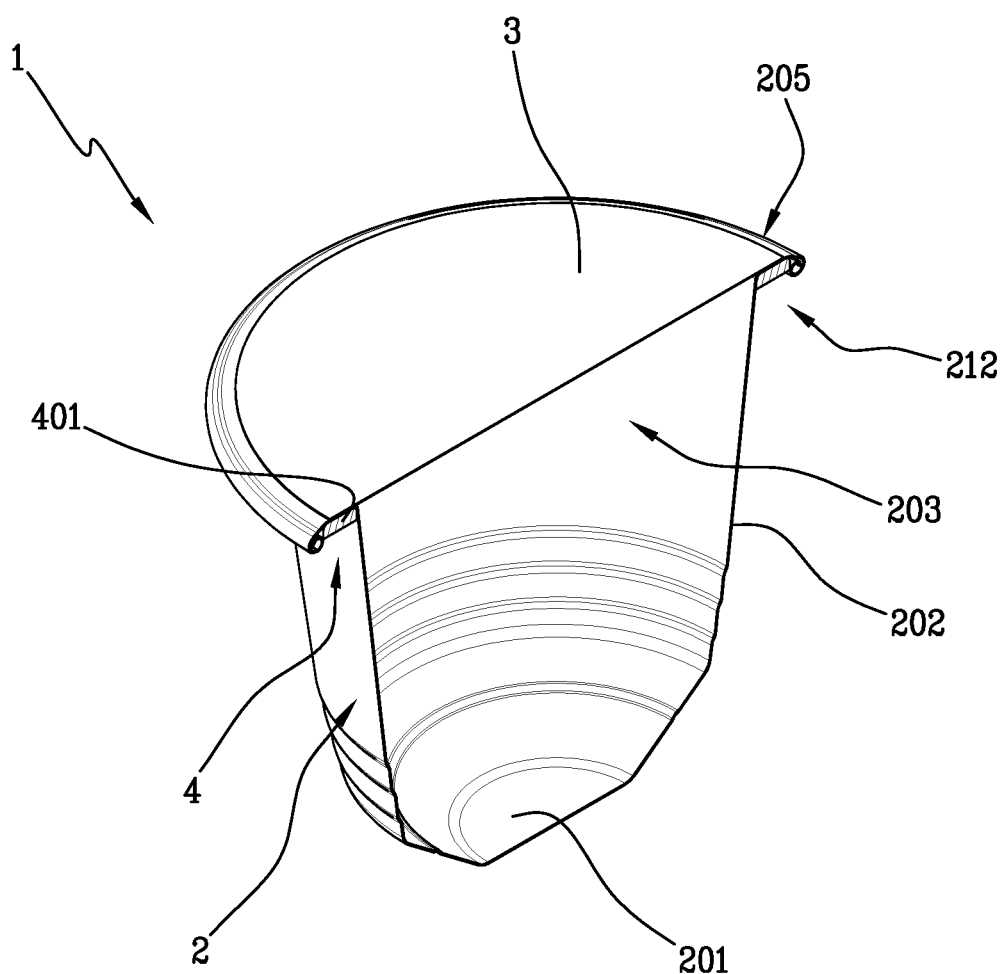
FIG. 2 shows a prospective section of the capsule of FIG. 1, on the side opposite the side of the base wall.
Figure 7:
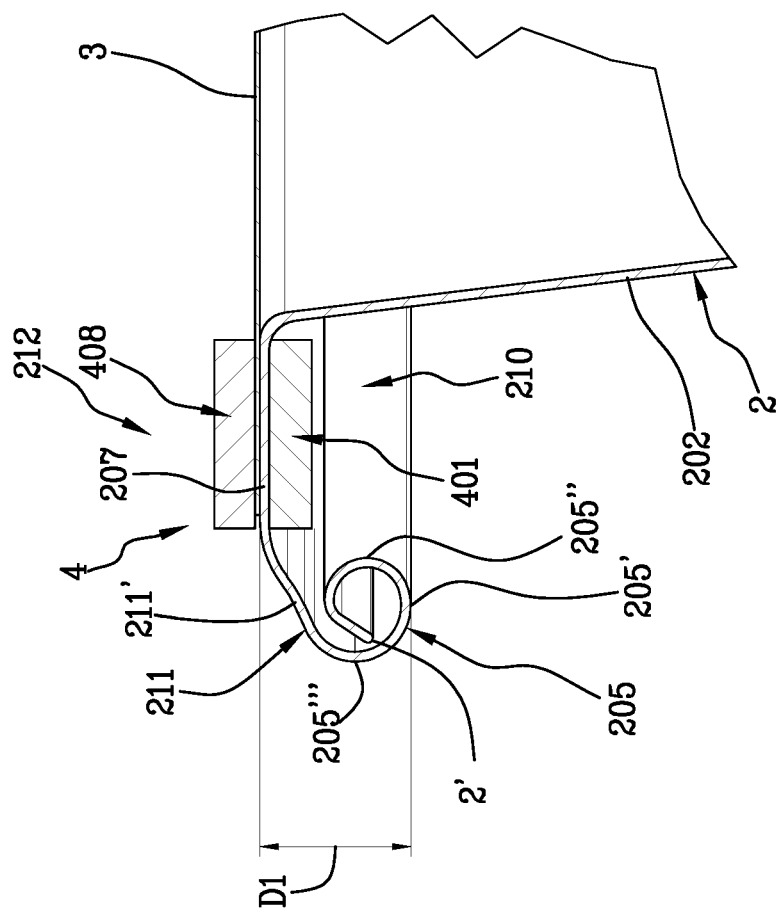
FIG. 7 shows an enlargement of the flanged edge of another different version of the capsule of FIG. 1, in which the sealing element comprises a ring associated with the flanged edge on the side facing the base wall and a further ring, arranged on the opposite side of the flanged edge and facing the ring.
Figure 8:
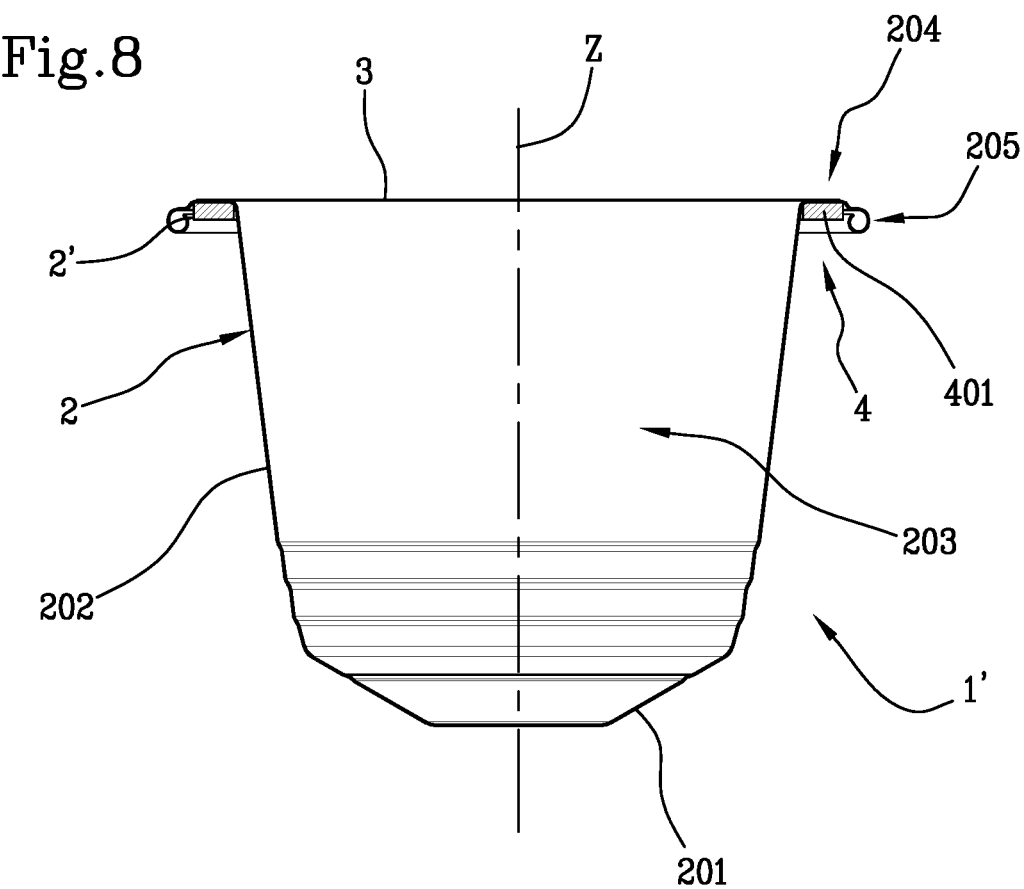
FIG. 8 shows a sectional view of a variant of the capsule of FIG. 1, which differs from the capsule of FIG. 1 in that it comprises a flanged edge in which a connecting portion is interposed between the first portion and the second portion.
Figure 9:
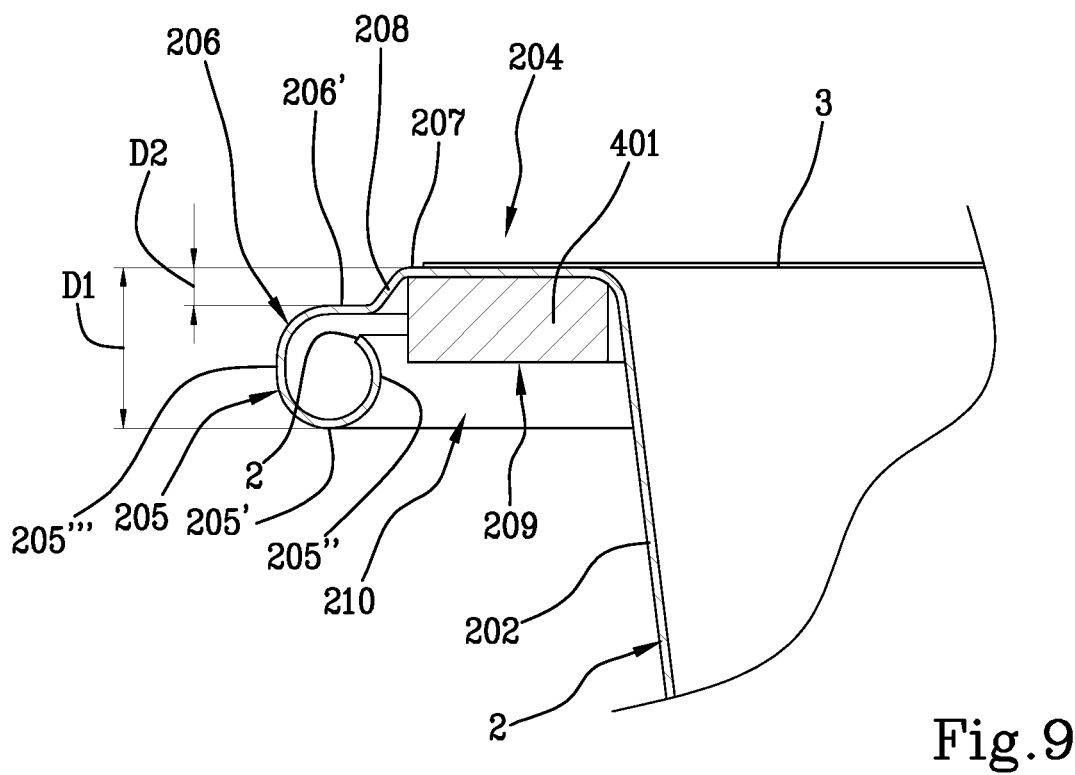
FIG. 9 is an enlargement of the sectional view of FIG. 8.

In other words, the paper or cardboard ring 401, which makes the sealing element 4, can be made of a single paper and/or cardboard layer, as shown in FIGS. 2 to 4, and in FIG. 7, and be retained by interference or be additionally fixed by the joining layer 405 to the second portion 207 of the aluminium flanged edge.

Figure 5:
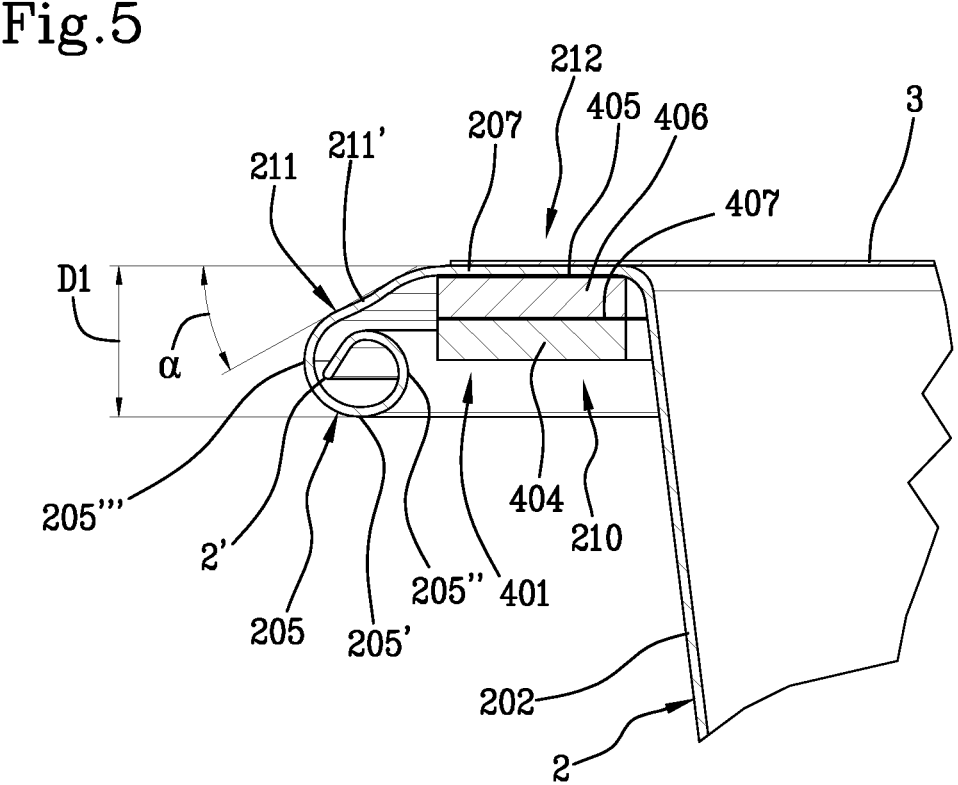
FIG. 5 shows an enlargement of the flanged edge of a version of the capsule of FIG. 1, in accordance with the present invention, in which the ring is made by a stratified structure fixed to the flanged edge, which comprises an outer layer and an inner layer superimposed and fixed together.

As shown in FIGS. 5 and 6, in accordance with the present invention, the ring 401 can be made by a stratified structure made by means of a plurality of layers 404, 406 superimposed on each other, in which the joining layer 405 is present for the coupling to the flanged edge 212 of the ring 401 and, moreover, a further joining layer 407 is interposed between two cellulose-based layers superimposed on each other.

The stratified structure can comprise an outer cellulose-based layer 404, arranged outwardly in contact with the dispensing machine, the joining layer 405 configured to enable the stratified structure to be joined to the flanged edge 212, an inner layer 406 made of cellulose-based material and the further joining layer 407, the latter joining together the outer layer 404 and the inner layer 406. The inner layer 406 is joined to the flanged edge 212 by the joining layer 405.

The ring 401 can be, for example, made at least with a double cellulose-based layer but, it is hereby specified, the stratified structure can also comprise a number of cellulose-based layers greater than two.

The stratified structure can have a plurality of cellulose-based layers 404, 406 superimposed on each other and alternated with further joining layers 407 and can have a joining layer 405, for joining to the flanged edge 212, as well as an outer layer 404 of cellulose-based material to contact the dispensing machine.

Optionally, according to a variant that is not shown, the outer layer 404 can be L-shaped to follow at least partially both the flanged edge 212 and the side wall 202.

The Applicant has verified that the presence of the joining layer 405, and therefore the fact that the ring 401 is fixed to the flanged edge 212, avoids the possibility that the ring 401 can be detached during dispensing during the injection of the pressurised liquid.

Above all, the presence of the further joining layer 407 between the two cellulose-based layers 404, 406, with the same other parameters defining the ring 401 (with the same thickness and/or grammage and/or composition) allows to further improve the fluidic losses with respect to a ring 401 which was made, for example, with a single cellulose-based layer and a joining layer for fixing to the flanged edge 212.

As indicated previously, the term "fluidic losses" means leaks of water from the front and/or rear part of the dispensing machine that are due to a defective fluidic seal between the sealing element 4 and the dispensing machine.

The joining layer 405 can be made of an adhesive material or a material like polythene, or a polyolefin, or polylactic acid (PLA) that, when it is applied to the second portion 207 by heat, becomes sticky and joins the single layer (if the ring is made of a single layer of cellulose-based material) or the inner layer 406 (in the case of the stratified structure) to the second portion 207.

The same considerations are also valid for the further joining layer 407, configured to join together the cellulose-based outer layer 404 and the cellulose-based inner layer 406, which is a layer of adhesive material that is activatable by heat.

The joining layer 405, and the further joining layer 407 can also be made by a hot glue that acts when it is activated by a heating device with heat, for example a device provided with a heating element with electrical resistance.

The joining layer 405 and also the further joining layer 407 can also be activated by a heating device with ultrasound welding.

In accordance with one variant, which is not shown, the flanged edge 212, and preferably the entire aluminium casing 2, can optionally be coated externally by a lacquer, which can be transparent, or coloured, which is suitable for joining with the joining layer 405 when the joining layer 405 is softened, or melts, by heat or ultrasounds to obtain adhesion of the joining layer 405 to the flanged edge 212.

The lacquer is configured to coat externally the aluminium, simultaneously personalizing the aluminium if it is coloured, and to facilitate the adhesion of the joining layer 405 to the aluminium of the casing 2. The lacquer can in fact be joined to the to the polythene or the polylactic acid, when both are heated (optionally the lacquer can also be heated), being activatable by heat, to enable the cellulose ring to be joined to the lacquer coating the aluminium.

Preferably, the lacquer is selected so as to be compatible with the joining layer 405, thus ensuring a permanent weld or in any case adhesion that is suitable for not detaching the ring 401 from the flanged edge 212 even during dispensing.

According to one version, the ring 401 is made by the stratified structure comprising the outer layer 404, the inner layer 406, the joining layer 405 and the further joining layer 407, and is configured to be placed resting on the second portion 207 when the joining layers 405, 407 have not been activated yet. In this case, the joining layers 405, 407 can both be activated simultaneously by heat, to join both the ring 401 to the flanged edge 212 and to join the cellulose-based layers together, thus defining a compact and monobloc annular body 401 fixed to the flanged edge 212.

Each cellulose-based layer, and i.e. the outer layer 404 and the inner layer 406, can have, for example, a grammage equal to 350 g/m2 for a total of 700 g/m2.

Each joining layer, i.e. the joining layer 405, or the further joining layer 407, can have, for example, a grammage of 15 g/m2, which corresponds to a thickness of a few microns, 15 microns, even before the stratified structure is joined to the flanged edge 212.

Although the thickness of the further joining layer 407 in the stratified structure is negligible, it makes the two cellulose-based layers 404 and 406 monobloc and advantageously increases the strength of the ring 401.

In fact, the further joining layer 407 acts as a barrier to the propagation of water infiltrations from one layer to another, keeping the cellulose fibres firmly in contact with each other, and therefore makes the ring 401 more difficult to flake off. Since the ring 401 is more robust thanks to the stratified structure, it can perform its function as a sealing element in an effective way during the entire dispensing of the final product and, therefore, it can allow to further reduce the fluidic losses compared to a ring 401 made with a single layer of cellulose-based material, with the same grammage and/or thickness and/or composition.

It should be noted that the thickness of the further joining layer 407 is so negligible that it does not participate in the fluidic seal meaning that the deformation of the cellulose-based ring 401 continues to remain a deformation of the plastic type, attributable exclusively to the cellulose-based material of which the ring 401 is made and not to the further joining layer 407.

Owing to the presence of the stratified structure in which layers of cellulose-based material are alternated with further joining layers, the fluidic losses can be improved, the sealing element being made in a simple and economical way.

Owing to the fact that the ring 401 can be made by at least a pair of cellulose-based layers 404, 406 that are joined together it is also possible to select each layer 404, 406 in an appropriate manner in terms of the grammage and/or the thickness and/or the composition.

For example, the outer layer 404, configured to be arranged externally, can be chosen with a grammage and/or thickness and/or composition that is different from the inner layer 406, such that the ring 401 has the characteristics required for uncoupling from the housing element of the dispensing machine, or of the fluidic seal, but at the same time also has a reduced cost.

The possibility of having a plurality of cellulose-based layers allows each layer to be selected with different properties. For example, the outer layer 404 can be selected with a lower density than the inner layer 406 underlying the outer layer 404, in order to deform better and promote the fluidic seal during dispensing, or it can be selected in a colour or texture that is different from the inner layer 406 (which is preferably neutral-white), so as to be able to be distinguishable for a user in relation to the final product to be dispensed.

According to one variant shown in FIG. 7, the sealing element 4 comprises a further ring 408 made of a cellulose-based material, which is fixed to the covering element 3 on the side opposite the flanged edge 212, and more precisely on the side opposite the second portion 207.

The further ring 408 is aligned on the ring 401 so as to make a stratified sealing element 4, in which the planar second portion 207 made of aluminium, and the covering element 3 joined thereto are inserted between the ring 401 and the further ring 408, arranged opposite and facing one another.

The ring 401 is associated with the second portion towards the base wall 201 while the further ring 408 is fixed to the covering element 3.

With regards to the further ring 408, what was said before applies, that is also the further ring 408 can be made of a single layer 404 of cellulose-based material, joined to the covering element 3 by the joining layer 405 or advantageously, in accordance with the invention, the further ring 408 can be made by the stratified structure comprising the outer layer 404, the inner layer 406 as well as the joining layer 405 and the further joining layer 407.

The further ring 408 can have a grammage and/or thickness and/or composition that is different from the ring 401.

It should be noted that, during dispensing, the further ring 408 contributes to the fluidic seal with the dispensing machine but it also performs the function of spacer between the capsule 1 and the dispensing machine.

In fact, the further ring 408, which is placed in contact with the dispensing plate of the dispensing machine, maintains the flanged edge 212 spaced apart from the dispensing plate and displaces the flanged edge 212 and the ring 401 towards the base wall 201, that is towards the protrusion-shaped housing element of the dispensing machine.

As a result, owing to the presence of the further ring 408, an overall reduced thickness can be sufficient for the ring 401, with a consequent economical advantage for selecting the material with which the ring 401 can be made.

The ring 401, or if present the further ring 408, preferably have a constant thickness and are planar.

It should be noted that, it has emerged to be particularly advantageous, in order to improve the defectiveness due to the uncoupling of the capsule at the end of dispensing, that the thickness of the ring 401 is comprised between 0.30 mm and 1.2 mm, preferably comprised between 0.55 mm and 1.10 mm, still more preferably comprised between 0.70 mm and 1.00 mm, preferably equal to 0.90 mm.

Experimental tests carried out by the Applicant have shown that by making a capsule 1 in which the casing 2 is made of aluminium and the sealing element 4 is made of a cellulose-based material, in which the first portion 211 is contained in a half-space, defined by the first plane identified by the second portion 207 and extends towards the base wall 201 as far as a free edge 205' of the annular bead 205, defining a recess 210 in which the ring 401 is housed entirely, the defectiveness linked to the failed uncoupling of the capsule 1 at the end of the dispensing is reduced.

Advantageously, the first portion 211 can be shaped without discontinuity from the border 2' through the curled annular bead 205 as far as the second portion 207.

The free edge 205' of the annular bead 205 is at a first distance D1 from the second portion 207 which is greater than or equal to the thickness of the ring 401. Therefore, the ring 401 is entirely contained in the recess 210 and friction between the ring 401 and the ejection guides of the dispensing machine is avoided, which allows to reduce the percentage of defectiveness in the dispensing machine due to the suspension in the machine.

Experimental tests have also shown that the defective dispensing operations due to the automatic uncoupling are reduced both with a thickness of the ring 401 equal to 0.45 mm, and with the thickness of the ring 401 equal to 0.90 mm.

The Applicant has also verified a significant improvement in the defectiveness due to fluidic losses, in addition to the improvement in the defectiveness due to uncoupling, with a thickness of the ring 401 comprised between 0.55 mm and 1.10 mm, still more preferably comprised between 0.70 mm and 1.00 mm, preferably equal to 0.90 mm.

With an increased thickness of the ring 401, although the uncoupling at the end of dispensing is still ensured, it is possible to obtain a reinforced fluidic seal, that is, a reduced quantity of front and/or rear fluidic losses compared to known aluminium capsules.

Despite the increased thickness, the defective dispensing operations due to the failed uncoupling are reduced even with a thickness of the ring 401 equal to 0.90 mm, compared to a capsule in which the casing comprises a planar aluminium flanged edge and an end annular bead that, in a direction parallel to the axis Z, extends symmetrically towards a base wall of the casing and on a side opposite the planar flanged edge.

Advantageously and in accordance with the present invention, the Applicant has also noted an improvement in fluidic losses with a cellulose-based double layer ring 404, 406 compared to the single layer version.

In use, the capsule 1 is inserted by a user into a chamber of the dispensing machine that is opened for this purpose by, for example, a lever mechanism. Using the same mechanism, the user can close the chamber to start dispensing and, when the chamber is closed, the protrusion-shaped housing element of the dispensing machine can compress the sealing element 4 that is the ring 401 inelastically to make the fluidic seal. During dispensing, the pressurized fluid is injected into the capsule and the ring 401, compressed inelastically by the housing element, makes the fluidic seal with the dispensing machine.

The same thing happens if the capsule 1, in addition to the ring 401, comprises also the further ring 408, arranged on a side opposite the ring 401.

When the pressurized liquid is injected, the pressure of the final product increases inside the capsule 1, which in turn deforms the covering element 3 towards the pointed elements of the dispensing plate of the dispensing machine, which perforate the covering element 3.

At the end of dispensing, the user can open the chamber by actuating again the lever mechanism to enable the capsule 1 to be uncoupled.

The free edge 205' of the annular bead 205 is at a first distance D1 from the second portion 207 which is greater than or equal to the thickness of the ring 401, therefore the ring 401 is entirely contained in the recess 210, friction is avoided between the ring 401 and the ejection guides of the dispensing machine and this enables the percentage of defectiveness of the dispensing machine due to the suspension in the machine to be reduced. For this purpose, preferably, the annular bead 205 is displaced towards the base wall 201 to ensure that, axially, the free edge 205' is beyond the thickness of the ring 401. The capsule 1 that has just been used, as soon as the user opens the chamber, can be in fact uncoupled from the housing element and can fall into the recovery receptacle of the already used capsules.

FIGS. 8 to 13 show a capsule 1' which differs from the capsule 1 shown in FIGS. 1 to 8 in that the capsule 1' is provided with a flanged edge 204 which differs from the flanged edge 212, described so far, in that it comprises a first portion 206, which differs from the first portion 211 described above.

However, what has been said previously still applies, that is the first portion 206 is contained in a half-space, defined by the first plane and facing the base wall 201 which extends in a direction parallel to the axis Z towards the base wall 201 as far as the free edge 205' of the annular bead 205, between the first portion 206 and the side wall 202 facing the first portion 206, the recess 210 being defined in which the ring 401 is housed and entirely contained, since the free edge 205' of the annular bead 205 is at the first distance D1 from the first plane which is greater than or equal to the thickness of the ring 401.

However, the flanged edge 204 additionally comprises a connecting portion 208 arranged between the first portion 206 and the second portion 207, the first portion 206 being displaced towards the base wall 201 at at least a second predetermined distance D2 from the first plane, between the connecting portion 208 and the side wall 202 a seat 209 in which the ring 401 is at least partially housed being defined.

The seat 209 is concave and has a respective bottom which is defined by the second portion 207.

The recess 210, which is defined between the first portion 206 and the side wall 202 and is itself delimited by a respective bottom which corresponds to the second portion 207, thus contains the seat 209.

The first portion 206 is displaced towards the base wall 201 and creates the seat 209 in which the ring 401 is at least partially housed. With this capsule 1', not only is an effective uncoupling from the dispensing machine ensured after dispensing but there is also an important improvement in the fluidic seal, that is, a reduced quantity of front and/or rear fluidic losses.

As regards the fluidic seal, the movement to the second distance D2 and the consequent change of level between the first portion 206 and the second portion 207, which lies in the first plane, allows the generation of a deformation in the flanged edge 204, at the connecting portion 208, which makes the flanged edge 204 itself more easily adaptable when, together with the ring 401, it is clamped between the housing element and the dispensing plate of the dispensing machine.

On the other hand, as regards the fall of the capsule 1 at the end of dispensing, the fact that the recess 210 can contain the ring 401 entirely inside itself still applies, since the free edge 205' is placed at a first distance D1 from the first plane which is greater than or equal to the thickness of the ring 401.

The seat 209, which can partially contain the ring 401 inside itself, can further facilitate the containment of the ring 401 and therefore further prevent any friction between the paper and the ejection guides (not illustrated) of the dispensing machine, which can prevent the capsule 1 from being properly uncoupled.

Also with this variant, therefore, the flanged edge 204 has the annular bead 205 displaced and the paper ring can be housed at least partially in the seat 209. The capsule 1 can considerably reduce the defectiveness related to the automatic uncoupling from the dispensing machine, and a reduction of the defectiveness linked to the fluidic losses.

It should be noted that the first portion 206 is contained in a half-space facing the base wall 201, which is defined by a second plane which is placed at the said second predetermined distance D2.

In other words, the second distance D2 is the distance at which the first portion 206 is displaced, which also comprises the annular bead 205.

It should be noted that the first portion 206 comprises an annular part 206', which is contiguous with the connecting portion 208 and is planar, the annular part 206' lying on the second plane.

The distance D2 is thus measurable in a direction parallel to the axis Z between the second portion 207 of the flanged edge 204, annular and planar, and the annular portion 206' of the first portion 206.

Again what has been said previously applies, that is, the first portion 206 is comprised between the inner edge 205' and the outer edge 205" of the curled annular bead 205 and the first portion 206 is defined without discontinuity by the border 2' of the casing 2 through the curled annular bead 205, as far as the planar annular wall 206'. The first portion 206 is therefore shaped like a spiral which, starting from the border 2' is wound initially around the border 2', defining the annular bead 205, and which, subsequently, is maintained in proximity to the annular bead 205 by the annular wall planar 206' as far as the connecting portion 208.

Unlike the first portion 211 of the capsule 1, which extends from the border 2' of the casing 2 without discontinuity as far as the first portion 206, between the first portion 206 of the capsule 1' and the connecting portion 208 there is a first change of slant, and between the connecting portion 208 and the second portion 207 there is a second change of slant. In other words, while in the flanged edge 212 of the capsule 1 there is a single discontinuity between the first portion 211 and the second portion 207, at the joint between the first portion 211 and the second portion 207, in the flanged edge 204 of the capsule 1' there is a first discontinuity between the first portion 206 and the connecting portion 208 (a first angle is defined) and a second discontinuity between the connecting portion 208 and the second portion 207 (a second angle is defined).

According to another version not shown, it is specified that if the capsule is made of another material (compostable material, PLA, or recyclable or recycled plastics), the fact that the flanged edge 204 can have such a shape can still apply, whereby the first portion 206 is contained in the half-space facing the base wall 201, despite lacking the annular bead 205; the flanged edge 204 of this other version can also have the first portion 206, in which the planar annular wall 206' is present, there being a first discontinuity between the first portion 206 and the connecting portion 208 and a second discontinuity between the connecting portion 208 and the second portion 207.

Although what has been said before still applies with respect to the first distance D1, which allows the thickness of the ring 401 to be entirely contained in the recess 210 within the free edge 205' of the annular bead 205, in a direction parallel to the axis Z, it is specified that the second distance D2 can be comprised between 0.10 mm and 0.90 mm, still more preferably comprised between 0.20 mm and 0.60 mm, still more preferably equal to 0.30.

The second predetermined distance D2 can also be equal to 0.50 mm.

Considering a dimension of the annular bead 205 in a direction parallel to the axis Z, which is for example equal to 1.30 mm and considering a second distance D2 equal to 0.30 mm, it can be noted that, in this way, a free edge 205' of the annular bead 205 extends towards the base wall 201 as far as a distance D1 from the first plane that is equal to 1.60 mm.

In relation to the second distance D2 and to the thickness of the ring 401, it can be observed that the ring 401 can be contained entirely, in a direction parallel to the axis Z, inside the seat 209 or can protrude therefrom and be contained entirely in the recess 210.

In other words, being the second portion 206 displaced towards the base wall 201, the annular bead 205 contributes to delimiting the recess 210 further laterally and defines, together with the connecting portion 208, a respective outer wall of the recess 210, that on the opposite side faces the side wall 202 of the capsule.

With the values provided above by way of example, the recess 210 is delimited externally by the connecting portion 208 and/or by the annular bead 205 up to 1.60 mm.

The connecting portion 208 can have a stepped truncated-cone conformation, as shown in FIGS. 8 to 13, or a curved conformation, for example with a change of slant, not illustrated.

In other words, the connecting portion 208 can be shaped as a tilted planar surface that connects the first portion 206 and the second portion 207 or as a surface in which a change of curvature is present.

As regards the association between the ring 401 and the flanged edge 204, what has been said previously with reference to the flanged edge 212 applies, specifying that the outer zone 402 of the ring 401 can extend as far as abutting on the first portion 206, and/or the connecting portion 208.

For example, the outer zone 402 can also abut on the annular bead 205 in relation to the thickness of the ring 401, as illustrated in FIGS. 11 and 13, in particular it can abut on the inner edge 205" of the annular bead 205 and be optionally flexed towards the base wall 201, as shown in FIG. 13.

In a variant not shown, the fact that the ring 401 can be L-shaped to at least partially follow both the flanged edge 204 and the side wall 202 is still valid.

However, as already said, the ring 401 can be associated only with the second portion 207 without necessarily abutting on the first portion 206, and/or the connecting portion 208, and/or the side wall 202, as it is sufficient for it to be associated to the flanged edge 204 in the region with which, during dispensing, the protrusion-shaped housing element of the dispensing machine engages.

The fact that the ring 401 can be joined to the flanged edge 204, and more precisely to the second portion 207, by the joining layer described above, is still valid.

As regards the way in which the ring 401 is made, in accordance with the present invention, it is specified that what previously described in relation to the capsule 1 of the Figures from 1 to 7, can also be applied without limitation of generality to the capsule 1' of the Figures from 8 to 13.

The ring 401 can comprise the stratified structure indicated above, in which, for example, the outer layer 404 and the joining layer 405, and the inner layer 406 and the further joining layer 407, like in FIGS. 10 and 11, are present.

Again, optionally according to a variant that is not shown, the outer layer 404 can be L-shaped to follow at least partially both the flanged edge 204 and the side wall 202.

Each cellulose-based layer, i.e. the outer layer 404 and the further layer 406, can have the grammage and thickness indicated above, which can be selected in an appropriate way as regards the grammage and/or thickness and/or the composition to ensure the characteristics required for the purpose of the fluidic seal and the uncoupling of the dispensing machine from the housing element and a reduced cost.

Also with this version of the capsule, thanks to the fact that the ring 401 is fixed to the flanged edge 204 and comprises a stratified structure made by a cellulose-based double layer 404, 406 superimposed on each other, in which the joining layer 405 and the further union layer 407 are present, an improvement in the fluidic seal has been noted with respect to a ring 401 made by a single cellulose-based layer.

Again, as previously said, the sealing element 4 can comprise the further ring 408, made according to the methods described above, fixed to the covering element 3 on the side opposite the second portion 207 like in FIG. 12, so that the further ring 408 and the ring 401 are aligned and opposite to each other.

In use, the capsule 1' is inserted by the user into the chamber of the dispensing machine and is used as previously described in relation to the capsule 1.

With the connecting portion 208, in which the flanged edge 204 is deformed to connect the first portion 206, displaced towards the base wall 201 at the second distance D2, and the second planar portion 207 to which the ring 401 is associated, the flanged edge 204 adapts to the dispensing machine and thus the fluidic seal achieved by the ring 401, and optionally by the ring 408, with the dispensing machine can be improved.

At the end of dispensing, when the chamber is opened to allow the capsule 1' to be uncoupled, the recess 210 containing the ring 401 entirely and the seat 209 containing at least partially the ring 401, the ejection guides of the dispensing machine do not contact the ring 401 and the capsule 1 just used, as soon as the user opens the chamber, can be uncoupled falling into the receptacle for the recovery of the capsules already used.

Experimental tests carried out by the Applicant have shown that by making a capsule 1', in accordance with FIGS. 8 to 13, in which the casing 2 is made of aluminium and the sealing element 4 is made of a cellulose-based material, in which the first portion 206 is contained in a half-space, defined by the first plane identified by the second portion 207 and extends towards the base wall 201 as far as a free edge 205' of the annular bead 205, defining the recess 210 in which the ring 401 is housed entirely, the defectiveness linked to the failed uncoupling of the capsule 1 at the end of the dispensing is reduced with respect to a capsule in which the casing comprises a planar aluminium flanged edge and an annular end bead which, in a parallel direction to the axis Z, extends symmetrically towards a base wall of the casing and on the side opposite the planar flanged edge.

The improvement of the uncoupling at the end of the dispensing is ensured also for the capsule 1' with a thickness of the ring 401 comprised between 0.30 mm and 1.2 mm, preferably comprised between 0.55 mm and 1.10 mm, still more preferably between 0.70 mm and 1.00 mm, preferably equal to 0.90 mm.

However, in the alternative, the experimental tests run with the capsule 1' with flanged edge 204 provided with the connecting portion 208, have shown that the defectiveness linked to front and/or rear fluidic losses is also further improved, even if the ring does not have an increased thickness but is comprised between 0.30 mm and 1.2 mm, preferably comprised between 0.55 mm and 1.10 mm, still more preferably comprised between 0.70 mm and 1.00 mm, preferably equal to 0.90 mm.

It should be further noted that it has been advantageously verified that both the capsule 1, in which the first portion 211 is shaped without discontinuity from the curled annular bead 205 as far as the second portion 207 and is joined thereto with discontinuity and in which the first distance D1 is greater than the maximum diameter of the annular bead 205 itself, that the capsule 1', in which the first portion 206 can be joined with a first discontinuity to the connecting portion 208 and with a second discontinuity from the connecting portion 208 to the second portion 207, ensure not only an improvement but also a zeroing of the defectiveness due to the failed uncoupling of the capsule 1, 1' at the end of dispensing. In fact, the free edge 205' of the annular bead 205 defines a recess which contains the ring 401 entirely inside it and furthermore, in both types of capsule, the annular bead 205 has its own free edge 205' axially displaced towards the base wall 201, the first distance D1 being greater than the maximum diameter of the annular bead 205 itself.

In the capsule 1, an increased thickness of the ring 401 is capable of positively influencing the defectiveness due to fluidic losses, although an uncoupling is ensured at the end of dispensing.

In the capsule 1', the shape of the flanged edge 204 with the movement of the first portion to the second distance D2 is capable of positively influencing, with any thickness of the ring 401, also the defectiveness due to fluidic losses, ensuring at the same time the capsule itself to be uncoupled at the end of dispensing.

Furthermore, in accordance with the present invention, the ring 401 having a cellulose-based double layer 404, 406 positively influences the dispensing efficiency, reducing fluidic losses, with any type of capsule described here.

Figure 16:
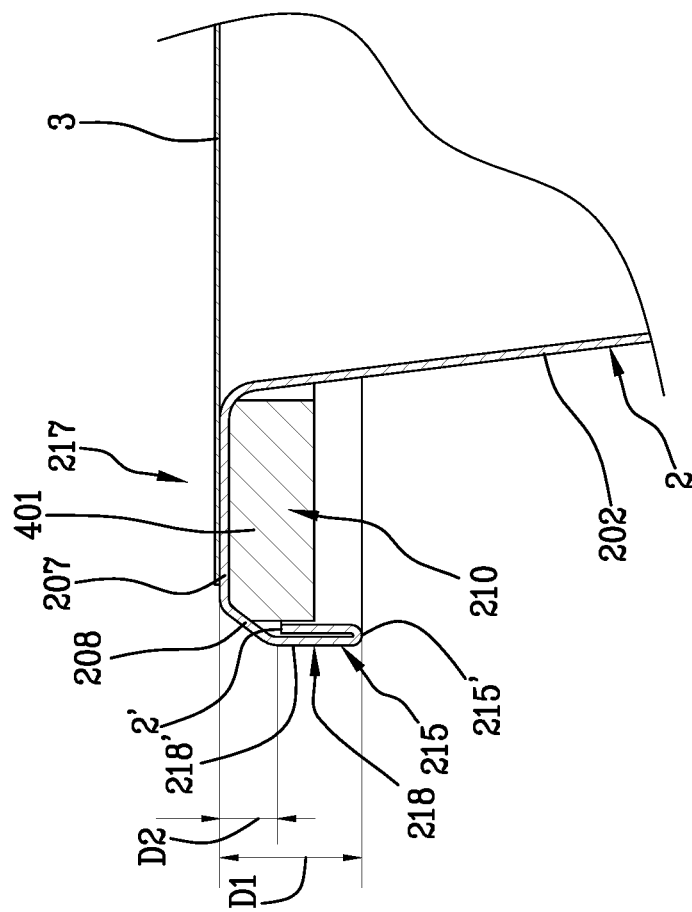
FIG. 16 shows an enlargement of the flanged edge of a different variant of the capsule of FIG. 14, which comprises a connecting portion between the first portion and the second portion and differs from the capsule of FIG. 8 in that the flanged edge comprises an annular bead in which the border of the casing is folded and flattened, the first portion being planar and forming a first discontinuity with the connecting portion, the connecting portion forming a second discontinuity with the second portion.

FIGS. 14 to 16 show a flanged edge 214 of a variant (not shown) of the capsule 1 in accordance with a second aspect of the invention.

In detail, FIGS. 14 and 15 show a flanged edge 214 which differs from the flanged edge 212 of FIGS. 1 to 7, in that it comprises a first portion 216 which is planar and an annular bead 215 which is folded starting from the border 2'.

According to a different version not shown, if the capsule is made of another material (compostable material, PLA, or recyclable or recycled plastic), the fact that the flanged edge 214 may have a shape such that the first portion 211, without the folded annular bead 215, is contained in the half-space facing the base wall 201 can still be valid.

The first portion 216 comprises a tilted wall 216' which is coplanar with the annular bead 215 and which forms the discontinuity with the second planar portion 207.

An angle β is defined between the tilted wall 216' and the second portion 207 and can be greater than or equal to 20° and less than or equal to 135°. In FIG. 14, for example, the angle β is equal to 90° while in FIG. 15 the angle β is equal to 60°.

For the angles β comprised between 90° and 135°, the first portion 216 is tilted towards the side wall 202, that is towards the ring 401.

The considerations previously made with reference to the capsule of FIG. 1 are valid, i.e. the fact that the annular bead 215 has a free edge 215' which defines the recess 210, capable of entirely containing the ring 401, and is at the first distance D1 from the first plane, defined by the second planar portion 207 which is greater than or equal to the thickness of the ring 401 is still valid.

It should be noted that the annular bead 215 of FIGS. 14 and 15, in addition to being folded around the free edge 215', is also flattened.

In fact, in the annular bead 215 there is a first flap defined between the free edge 215' and the border 2' of the casing which is placed in contact with a second flap defined starting from the free edge 215', on the side opposite the first flap.

The second flap extends, for example, from the free edge 215' to the tilted wall 216'.

In a version not shown, the annular bead 215 can also be V-shaped meaning that the first flap and the second flap may not be parallel and in contact with each other, but can form an angle between them whose vertex is the free edge 215'.

As regards the manner in which the ring 401 is made and the positioning thereof in association with the second portion 207 of the flanged edge 214, it is specified that what has already been described above is valid.

Advantageously, therefore, in accordance with the present invention, the capsule can comprise a ring 401 fixed to the flanged edge 214 in accordance with the present invention, which is made by the stratified structure which can have a plurality of cellulose-based layers 404, 406 superimposed on each other and alternated with further joining layers 407. The joining layer 405 can allow the coupling to the flanged edge 214 and the fixing thereto.

The annular bead 215 is folded in the first portion 216, in this way the aluminium casing 2 is very simple to make and is economical.

In addition, the border 2' of the casing 2, after being folded, faces the second portion 207 and is also partially hidden by the ring 401.

In this way, no pointed aluminium parts which could harm the user are exposed.

In fact, in relation to the angle β between the first portion 216 and the second portion 207, the ring 401 can entirely, along its entire thickness, abuts on the first portion 216, like in FIG. 14, if the first portion 216 forms a 90° angle with the second portion 207. If the angle β is an acute angle, then the ring only partially abuts on the first portion 216, like in FIG. 15.

FIG. 16 shows a flanged edge 217 of a variant (not shown) of the capsule 1', which differs from the flanged edge 204 of FIGS. 8 to 13, in that it comprises a first portion 218 which is planar, the connecting portion 208 connecting the first portion 218 and the second portion 207 and an annular bead 215 which is folded around the free edge 215' starting from the border 2'.

The annular bead 215 can be flattened but, as previously detailed, the annular bead 215 can also be V-shaped, in relation to whether the first flap and the second flap are, or not, in contact with each other.

Note that the first portion 218 is displaced towards the base wall 201 by the second distance D2.

The first portion 218 comprises a tilted wall 218' which is coplanar with the annular bead 215 and which forms a first discontinuity (i.e. a first angle) with the connecting portion 208, which in turn forms a second discontinuity (i.e. a second angle) with the second portion 207.

Again, the considerations previously made with reference to the capsule 1' of FIGS. 8 to 13 are valid, i.e. the fact that the annular bead 215 has a free edge 215' which defines the recess 210, capable of containing the ring 401 entirely, and that the first portion 218 is displaced towards the base wall 201 and is arranged at least at the second distance D2 from the first plane, the latter being defined by the second portion 207, is still valid.

According to another different version not shown, if the capsule is made of another material (compostable material, PLA, or recyclable or recycled plastic), the fact that the flanged edge 217 may have a shape such that the first portion 218, without the folded annular bead 215, is contained in the half-space facing the base wall 201 and is displaced towards the base wall 201 and forms a first discontinuity with the connecting portion 208 and a second discontinuity with the second portion 207 can still be valid.

As regards the manner in which the ring 401 is made in the flanged edge 217 and the positioning thereof, it is specified that what previously described applies, in relation to FIGS. 1 to 13.

Advantageously, therefore, in accordance with the present invention, the capsule can comprise a ring 401 fixed to the flanged edge 217 in accordance with the present invention, which is made by the stratified structure which can have a plurality of cellulose-based layers 404, 406 superimposed on each other and alternated with further joining layers 407. The joining layer 405 can allow the coupling to the flanged edge 217 and the fixing thereto.

Also in this case, if the casing is made of aluminium, since the annular bead 215 is folded in the first portion 218, it is very simple to make and is economical. Again, since the border 2' of the aluminium casing 2 is folded and partially hidden by the ring 401, no pointed aluminium parts which might damage the user are exposed.

The invention claimed is:

1. A capsule comprising:
    a casing that extends about an axis, the casing comprising a base wall and a side wall defining a cavity containing an initial product to be joined to a fluid to obtain a final product, and a flanged edge extending from said side wall;
    a covering element, fixed to the flanged edge to close the cavity;
    a sealing element, joined to the flanged edge to make a fluidic seal with a dispensing machine;
    the sealing element comprising a cellulose-based ring; and
    the ring comprising a stratified structure which comprises:
        at least two cellulose-based layers, including an outer layer arranged towards an outside and configured to contact the dispensing machine and an inner layer;
        a joining layer to enable the ring to be joined to the flanged edge; and
        a further joining layer, to join together the at least two cellulose-based layers.

2. The capsule according to claim 1, wherein the inner layer is superimposed on the joining layer and is joined to the flanged edge.

3. The capsule according to claim 1, wherein the ring has a thickness comprised between 0.30 mm and 1.20 mm.

4. The capsule according to claim 1, wherein each of the at least two cellulose-based layers has a grammage comprised between 250 g/m$^2$ and 900 g/m$^2$.

5. The capsule according to claim 1, wherein each of the joining layers, that is the joining layer or the further joining layer, is made of a material activatable by heat.

6. The capsule according to claim 5, wherein each joining layer is made of polythene, or a polyolefin, or polylactic acid.

7. The capsule according to claim 5, wherein both the joining layer and the further joining layer have a same grammage which is equal to 15 g/m$^2$ and corresponds to a thickness of 15 microns before joining to the flanged edge.

8. The capsule according to claim 1, wherein the at least two cellulose-based layers differ from each other as regards thickness and/or grammage and/or composition.

9. The capsule according to claim 1, wherein the at least two cellulose-based layers are identical and have a grammage equal to 350 g/m$^2$, corresponding to a thickness of 0.45 mm, to make a ring with an overall thickness equal to 0.90 mm.

10. The capsule according to claim 1, wherein the casing is made of aluminum and at least the flanged edge, and an entirety of the casing, is externally coated with a lacquer; and wherein the joining layer is made of a material activatable by heat, so that the joining layer melts with the lacquer to join the ring to the flanged edge when at least the joining layer is softened, or melted by heat.

11. The capsule according to claim 1, wherein the sealing element comprises a further cellulose-based ring, which is fixed to the covering element on a side of the covering element opposite the flanged edge.

12. The capsule according to claim 11, wherein the further cellulose-based ring is made by a single cellulose-based layer.

13. The capsule according to claim 11, wherein the further cellulose-based ring is made by a stratified structure comprising at least two further cellulose-based layers, including a further outer layer and a further inner layer superimposed on each other; a further joining layer to enable the further cellulose-based ring to be joined to the covering element; and a yet further joining layer, to join together the at least two further cellulose-based layers.

14. The capsule according to claim 1, wherein the casing is made of aluminum and the flanged edge comprises, at an outer end, an annular bead inside which a border of the casing is folded.

15. The capsule according to claim 1, wherein the casing is made of polylactic acid or a cellulose-based material, or a recyclable plastic material, and wherein the flanged edge is planar.

16. The capsule according to claim 1, wherein the outer layer is L-shaped to at least partially follow both the flanged edge and the side wall.

17. The capsule according to claim 3, wherein the ring has a thickness comprised between 0.55 mm and 1.10 mm.

18. The capsule according to claim 3, wherein the ring has a thickness comprised between 0.70 mm and 1.00 mm.

19. The capsule according to claim 4, wherein each of the at least two cellulose-based layers has a grammage comprised between 300 g/m$^2$ and 750 g/m$^2$.

20. The capsule according to claim 4, wherein each of the at least two cellulose-based layers has a grammage equal to 350 g/m².

\* \* \* \* \*